3,261,318
HYDRODYNAMIC VEHICLE
Burton A. Jones, 419 Lighthouse Drive, and George D. Lewis, 619 Riverside Road, both of North Palm Beach, Fla.
Filed Dec. 7, 1964, Ser. No. 416,243
9 Claims. (Cl. 114—16)

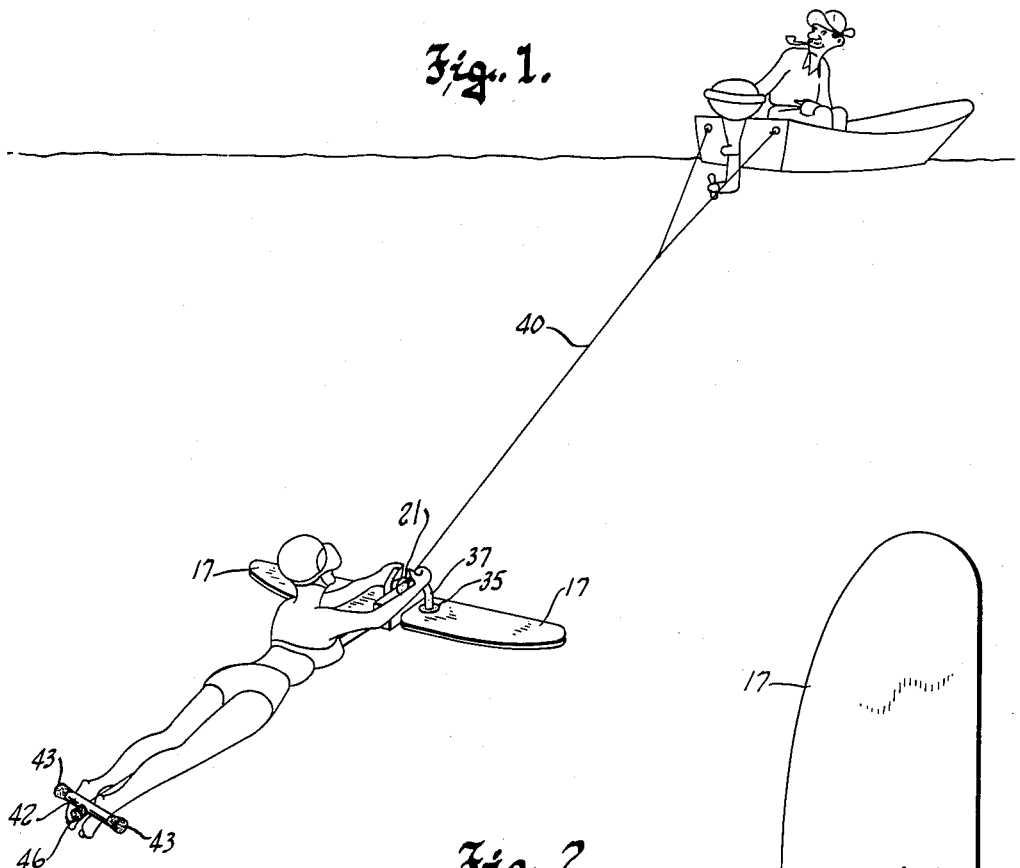
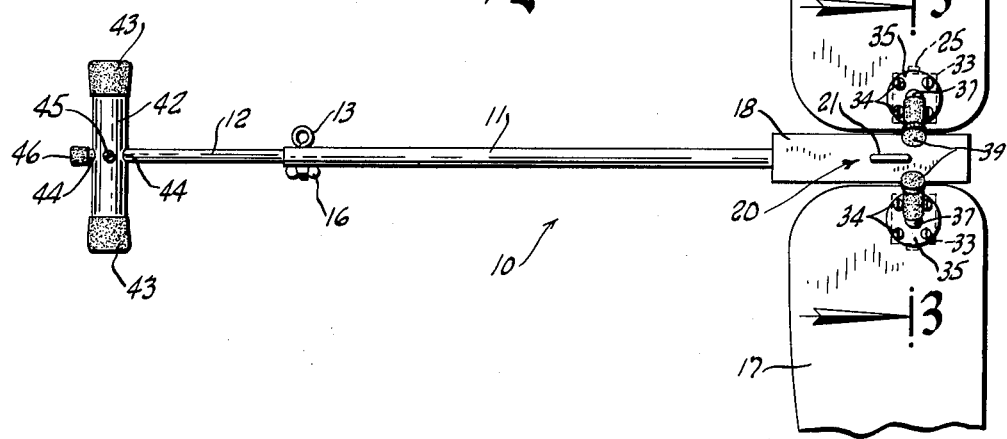

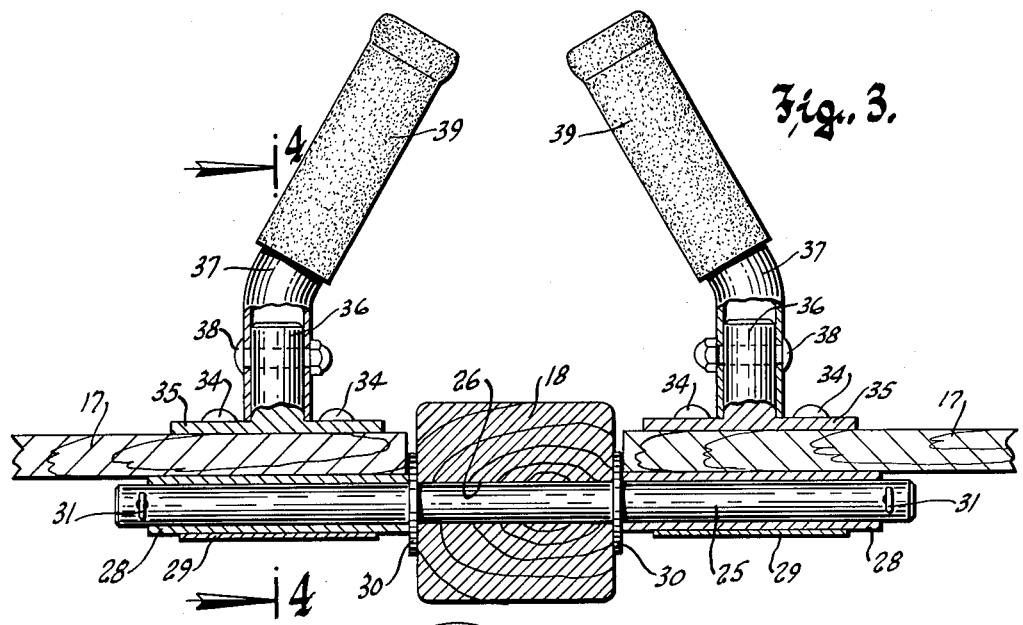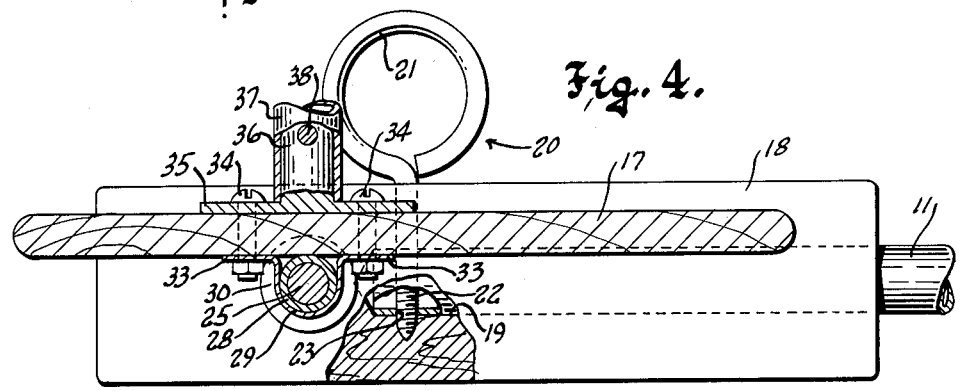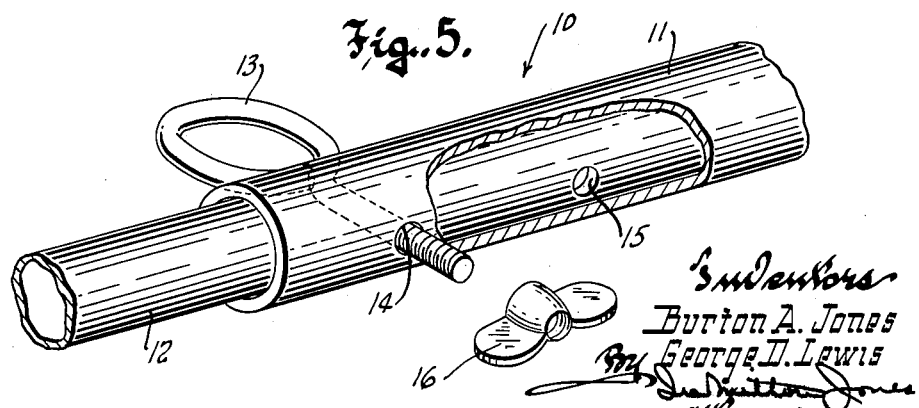

This invention relates to hydrodynamic devices generally, and has more particular reference to improvements in hydrodynamic devices of the type adapted to provide a vehicle upon which a rider may be towed in a prone position either on or beneath the surface of a body of water for exploration or pleasure.

The primary objective of this invention resides in the provision of a hydrodynamic vehicle which will be easily capable of rider controlled maneuvers under the water similar to those possible by an airborne glider, such as rapid ascent and descent, banking to the right or left, and performing barrel rolls.

Another object of the invention resides in the provision of a hydrodynamic vehicle of the character described which can be readily adjusted to accommodate children or adults, and can be operated without requiring the rider to be equipped with underwater breathing apparatus because of the ease and rapidity with which it can be made to dive and rise to the surface.

Further objects of this invention reside in the provision of a hydrodynamic vehicle which will float when at rest, which features simplicity of construction and low cost, and which can be readily assembled and disassembled to facilitate storage and transportation to and from a body of water in which the vehicle is to be used.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a perspective view of the hydrodynamic vehicle of this invention, showing how a rider in a prone position thereon can be towed by a motor boat;

FIGURE 2 is an enlarged plan view of the vehicle;

FIGURE 3 is a fragmentary sectional view taken through FIGURE 2 along the line 3—3, but at an enlarge scale;

FIGURE 4 is a sectional view taken through FIGURE 3 along the line 4—4; and

FIGURE 5 is a fragmentary perspective view illustrating the manner in which the vehicle can be adjusted to accommodate riders of different height.

Referring now to the accompanying drawings, wherein like reference characters indicate like parts throughout the views, the numeral 10 generally designates the body of the hydrodynamic vehicle of this invention. The body 10 comprises an elongated shaft-like member here shown as consisting of an outer forward tubular member 11 and an inner rear tubular member 12 slightly smaller in diameter than the forward member and assembled in telescoping relation therewith. An eye bolt 13 passing through holes 14 in the outer tubular member and engaged in any of a number of holes 15 spaced along the length of the inner tubular member holds the inner and outer tubular members connected in any of a number of different positions of axial adjustment, and is detachably held in place by a wing nut 16. The tubular members 11 and 12 can be made of light gauge corrosion resistant material, such as aluminum, to minimize weight.

A pair of identical elongated wings or hydrofoils 17 extend lengthwise in opposite lateral directions from the front end portion of the body, at either side of a substantially narrow wing mounting block 18 which is fixed on the forward end portion of the outer tubular member 11. Both the wings and the block are preferably made of wood, or of any material having equivalent strength and buoyancy sufficient to cause the vehicle to float when it is at rest in the water. The block 18 may have a rectangular cross section, as shown, sufficiently larger than the diameter of the outer tubular member 11 as to enable the forward end portion of the latter to be received in a longitudinal hole 19 in the block opening to its rear.

It is a feature of this invention that a single fitting 20 not only provides a ring 21 to which a tow line may be tied, but also serves to secure the shaft-like body member 10 to the block 18. For this purpose, the fitting 20 may be in the nautre of an eye screw having its shank 22 threaded down into the block from the top thereof, and passing through diametrically opposite holes 23 in the front end portion of the outer tubular member 11 in the manner seen best in FIGURE 4. Hence, the pull of a tow line can be transmitted substantially directly to the shaft-like body member 10, with little or no strain on the block 18.

The wings or hydrofoils 17 are individually tiltably mounted on a transverse axle 25 carried by the block 18, being received in a hole 26 therein just forwardly of the front extremity of the outer tubular member 11. The opposite ends of the axle project from the sides of the block and under the adjacent inner end portions of the wings 17 for a distance somewhat greater than the transverse dimension of the block, as seen best in FIGURE 3. They are freely rotatably received in tubular bearing members 28 that are secured to the undersides of the hydrofoils or wings by means of straps 29.

A friction reducing washer 30 is preferably interposed between the block and the adjacent or inner ends of the tubular bearing members 28. The outer ends of the axle 25 project a short distance beyond their respective bearing members 28 and carry cotter keys 31 whereby the axle is maintained detachably assembled to the block 18 and the hydrofoils or wings 17 are removably held in place on the projecting ends of the axle.

The straps 29 have opposite flanges 33 which flatwise engage the undersides of the hydrofoils or wings 17, to which the straps are secured by pairs of bolts 34 passing through each flange 33. The same bolts 34 are employed to secure the flanges 35 of handle anchors 36 to the upper sides of the hydrofoils or wings 17. Tubular handles 37, one for each wing and preferably of light weight material such as aluminum, have their lower ends telescoped over the anchors 36, to which each may be secured in any suitable fashion, for example by a bolt 38. The upper ends of the handles are preferably bent inwardly toward one another to overlie the block 18, and they are preferably provided with grips 39 of rubber or the like, which cover the open upper ends of the tubular handles.

Referring to FIGURE 2, it will be seen that the hydrofoils or wings 17 have a length substantially two and one-half times their chord so as to assure proper balance between pitch and roll forces. Also, the transverse axis about which the hydrofoils or wings tilt is so located that about one-third of the hydrofoil area is located forwardly of the tilt axis so as to dispose about two-thirds of the hydrofoil area behind the tilt axis. This is advantageous in that it enables the wings or hydrofoils to be tilted either individually or simultaneously in the same or opposite directions with the least possible effort.

From the description thus far, it will be appreciated that the hydrodynamic vehicle of this invention may be towed lengthwise in the water by a motor boat or the like when a tow line 40 is attached to the ring 21 on the body block 18, and that a rider such as indicated in FIGURE 1 may occupy a prone position over the shaft-like body member 10 and steer or maneuver the vehicle either by pushing or pulling on the handles 37 to individually or simultaneously tilt the wings or hydrofoils up or down. According to this invention, the handles are substantially entirely relieved of the drag of the rider to facilitate maneuvering of the vehicle, and this purpose is achieved through the provision of a cross bar 42 on the rear of the shaft-like body member that provides a foot rest at each side of the tubular member 12 at its rear. The cross bar 42 is preferably a substantially short tube of aluminum having its opposite ends covered by rubber caps 43, and having diametrically opposite holes 44 in its medial portion through which the rear portion of the tubular body member 12 projects. A screw 45 serves to lock the foot rest in place on the rear of the vehicle, at a location just far enough ahead of the rear extremity of the rear tubular body member 12 as to enable a rubber cap 46 to be applied to its extremity.

When the feet of a rider are braced against the laterally projecting end portions of the cross bar 42, in the manner seen in FIGURE 1, the thrust of the towed vehicle is transmitted into the limbs of the rider and the handles 37 are thus free for use substantially exclusively in maneuvering the vehicle, which is thereby facilitated due to the ease by which the hydrofoils may be tilted. The location of the handles at areas directly over the axle, of course, and the location of the tow line ring 21 close to the axle, are factors which contribute to the ease with which the hydrofoils or wings may be tilted and the vehicle maneuvered by a rider thereon.

It is also a feature of the invention that the upper portions of the handles 37 are tilted toward one another and located close enough together as to enable a rider to hold both handles by one hand, to thus free his other hand for picking up objects of interest from the bottom of a body of water in which the vehicle is operated.

If desired, the rider can wear a safety belt that can be attached to the vehicle in any suitable manner. The eye bolt 13, of course, can be used for that purpose.

It will also be appreciated that the vehicle can be readily adjusted as to length, by means of the eye bolt 13 and the holes in the telescoped tubular body members, to adapt it for use by riders of different height. For example, in one position of adjustment such as seen in FIGURE 2, the distance from the hydrofoils to the foot rest 42 is substantially at a minimum to enable children to ride astride the vehicle, in the prone position indicated in FIGURE 1. The body member 10, of course, must be adjusted to give it greater length whenever adult persons use the vehicle.

From the foregoing description, together with the accompanying drawings, it will be readily apparent to those skilled in the art that this invention provides an improved hydrodynamic vehicle which features simplicity and light weight construction, easy maneuverability by a rider occupying a prone position thereon, and ready adjustability for length along with ease of assembly and disassembly for compact storage and transportation to and from a point of use.

What is claimed as our invention is:

1. A hydrodynamic vehicle by which a rider may be towed in a prone position either on or beneath the surface of a body of water, comprising:
   (A) an elongated shaft-like member having a forward end and a rear end;
   (B) means connected with the forward end of the shaft-like member to provide for attachment of a tow line to the vehicle;
   (C) a pair of opposite elongated hydrofoils extending lengthwise from opposite sides of the shaft-like member at its forward end;
   (D) means connecting said hydrofoils with the forward end portion of the shaft-like member to provide for tilting movement of the hydrofoils relative to the shaft-like member and to one another about a common axis transversely of the shaft-like member;
   (E) handles secured to the upper sides of said hydrofoils and adapted to be grasped by the hands of a rider occuping a prone position over the shaft-like member to enable the hydrofoils to be angularly adjusted individually or simultaneously in either direction about their axes;
   (F) and a cross bar secured to the rear end of the shaft-like member to provide rests for the feet of a rider, at each side of the shaft-like member, through which the thrust of the towed vehicle is transmitted to the rider to more or less free the handles of the drag of the rider's weight and thereby facilitate tilting of the wings to render the device easily maneuverable.

2. The hydrodynamic vehicle of claim 1, wherein said shaft-like member comprises elongated front and rear members, and one of which is tubular and axially slidably encircles the other to provide for adjusting the length of the shaft-like member in correspondence with the length of a rider for the vehicle; and further characterized by means to hold said front and rear members connected in different positions of axial adjustment.

3. The hydrodynamic vehicle of claim 1, wherein each of said hydrofoils is so connected with the forward end of the shaft-like member that substantially one-third of its area is located forwardly of the axis about which the hydrofoil tilts to assure easy maneuverability of the hydrofoils by force manually applied to said handles; and wherein each hydrofoil has a span substantially two and one-half times its chord to assure proper balance between pitch and roll.

4. The hydrodynamic vehicle of claim 1 wherein said handles are secured to the upper sides of the hydrofoils at locations close to the opposite sides of the shaft-like member, and the handles are inclined toward one another so that both handles may be held by one hand if desired.

5. The hydrodynamic vehicle of claim 1, wherein said handles are secured to the hydrofoils directly over the tilt axes of the latter; and wherein said means which provides for the attachment of a tow line to the vehicle is connected with the shaft-like member at a location adjacent to the common transverse axis about which the hydrofoils tilt.

6. The hydrodynamic vehicle of claim 1, further characterized by a substantially narrow block-like body member positioned between the hydrofoils and having a hole therein to receive the forward end portion of the shaft-like member; and wherein a single fitting secured in said body member has interlocking engagement with the forward end portion of the shaft-like member to secure the latter to the block-like body member and to also provide said means for attaching a tow line to the vehicle.

7. The hydrodynamic vehicle of claim 1, wherein a narrow, block-like body member is secured on the forward end portion of the shaft-like member between the adjacent ends of the hydrofoils, said block-like member extending forwardly beyond the adjacent extremity of the shaft-like member and having a transverse hole therethrough at a location ahead of the shaft-like member; wherein an axle member is received in said hole and has opposite ends projecting from the opposite sides of the body member and under the inner ends of the hydrofoils; and wherein each of said hydrofoils has a bearing member secured to its underside, in which the adjacent end of the axle member is received to individually tiltably mount the hydrofoils on the axle member.

8. The hydrodynamic vehicle of claim 1, wherein the rear portion of the shaft-like member extends into and is secured in a hole in the medial portion of said cross bar.

9. In a hydrodynamic vehicle:
(A) a body comprising
   (1) an elongated shaft-like member having a forward end and a rear end,
   (2) and a narrow block secured to the forward end of the shaft-like member, and extending lengthwise thereof;
(B) a pair of axles carried by said block and extending laterally from opposite sides thereof on a common transverse axis;
(C) elongated hydrofoils tiltably supported by said axles with the hydrofoils extending lengthwise of their respective axles and opposite one another;
(D) handles on said hydrofoils, extending upwardly from the top surfaces thereof at locations adjacent to said block;
(E) a tow line connector fixed with respect to said block;
(F) and means on the rear of said shaft-like member providing a foot rest at each side of the shaft-like member.

References Cited by the Examiner
UNITED STATES PATENTS

| | | | |
|---|---|---|---|
| 3,101,691 | 8/1963 | Wendt | 114—16 |
| 3,139,055 | 6/1964 | Nutting | 114—16 |

MILTON BUCHLER, *Primary Examiner.*

T. M. BLIX, *Assistant Examiner.*